3,066,167
4-AMINO-3,5-DICHLORO-BENZAMIDES
Bruce W. Horrom, Waukegan, Ill., assignor to Abbott Laboratories, North Chicago, Ill., a corporation of Illinois
No Drawing. Filed Feb. 16, 1961, Ser. No. 89,661
4 Claims. (Cl. 260—558)

This invention relates to amides of substituted benzoic acid. More particularly, it is concerned with amides of specific 3,4,5-trisubstituted benzoic acids and with methods for preparation of such compounds.

The novel compounds of this invention are represented by the formula:

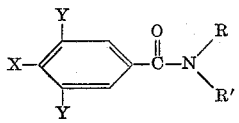

wherein R is an aliphatic, alicyclic, saturated, unsaturated or branched radical with 3–4 carbon atoms; R' is H, lower alkyl or $CH_2CH_2OH$; Y is chlorine or bromine; and X is $NH_2$, loweralkylamine or di(loweralkyl) amine.

Essentially all of these compounds are made by reacting 4-amino-3,5-dihalobenzoic acid or the corresponding reactive derivatives with an amine containing one nitrogen substituent with 3–4 carbon atoms in straight, cyclic, branched, unsaturated or saturated configuration, and wherein a second nitrogen substituent is hydrogen, lower alkyl or β-hydroxyethyl. This amine reacts with the carbonyl radical of the benzoic acid derivative mentioned above. Such a reactive carbonyl radical may be in the form of the acid halide or it may be a lower alkyl ester.

In the preferred embodiment, the reaction between the substituted benzoic acid chloride and the amine selected from the above group is carried out in the presence of an acid acceptor, i.e., a trialkylamine, N,N-dialkylaniline, an alkali carbonate, an earth alkali carbonate, an earth alkali bicarbonate, an alkali bicarbonate, etc. or an excess of the selected amine used for the reaction. The reaction may be performed in an inert diluent such as ether, acetone, ethyl acetate, benzene, dimethylacetamide and similar solvents. The term "inert" is used to express that such a diluent is unreactive to the participants of the reaction, the end product, and the acid acceptor where the latter is used. The reaction can be performed within a temperature range of between —20° and +50° C. or the boiling point of the diluent, whichever is lower. The preferred temperature is room temperature.

The new substituted benzamides are strong muscle relaxants; i.e. they possess the pharmacological properties of relaxing skeletal muscles through inhibition of synaptic transmission in the spinal cord as distinguished from the neuromuscular blocking action of compounds of the curare type, or the severely central depressing compounds such as the barbiturates. The new compounds are also useful as tranquilizers, anti-convulsants, and anti-strychnine compounds. One dose of the new compounds produces muscle relaxation, tranquilization and anti-emetic effects lasting from 8 to 20 hours.

The following examples are presented to teach the invention but should not be construed as exclusive embodiments of the invention. They are only presented to illustrate the manufacture of some members of the heretofore unknown series.

EXAMPLE 1

4-Amino-3,5-Dichloro-N-Cyclopropylbenzamide

To a mixture of 6.9 g. of cyclopropylamine and 12.2 g. of triethylamine in 200 cc. of ether is added dropwise 27.2 g. of 4-amino-3,5-dichlorobenzoyl chloride in 400 cc. of acetone/ether (ratio 1:1) in an ice bath. After completion of the addition, the reaction mixture is allowed to adjust to room temperature, and stirring is continued overnight. The reaction mixture is filtered and the collected triethylamine hydrochloride is washed well with ether. The combined washes and filtrate are evaporated to dryness. The product, 4-amino-3,5-dichloro-N-cyclopropylbenzamide, is triturated in water, filtered and dried. It is recrystallized from 50% aqueous alcohol to yield 23.3 g. (79% of theory) of slightly tan needles melting at 174–175° C. The analysis of the recrystallized compound shows 49.07% C, 4.26% H, 11.61% N, and 28.83% Cl; the theoretical values are: 48.99% C, 4.11% H, 11.43% N, and 28.93% Cl.

In a modification of this example, similar results are obtained by replacing the triethylamine with additional amounts of cyclopropylamine. In this case, 1 mole of the acid chloride is reacted with 2 moles of cyclopropylamine.

A 5% suspension of this 4-amino-3,5-dichloro-N-cyclopropylbenzamide in 0.2% tragacanth is used to establish toxicity and activity in mice. With oral of intraperitoneal administration, the $LD_{50}$ in mice is 400 mg./kg.; decreased activity is found in mice at 50 mg./kg. intraperitoneally and at 100 mg./kg. orally. With an intraperitoneal or oral dose of 300 mg./kg., test mice show pronounced decrease in muscle tone. In rats, pronounced decreased muscle tone is observed orally at 100 mg./kg. and pronounced decreased activity at 150 mg./kg. orally. The drug also prevents the action of strychnine to a significant extent.

EXAMPLE 2

4-Amino-3,5-Dichlorobenzoyl Chloride

A mixture of 25 g. of 4-amino-3,5-dichlorobenzoic acid and 100 cc. of thionyl chloride is refluxed. After 4 hours the excess thionyl chloride is distilled off and the last traces of it are removed by adding 100 cc. of benzene, distilling off the benzene, and repeating this boiling benzene extraction. The cooled solid acid chloride may be used without further purification. For characterization, it is recrystallized from acetone/pentane. Its melting point is 161–162° C. It can also be recrystallized from benzene/pentane.

The above ratio of 1 part of 4-amino-3,5-dichlorobenzoic acid and 4 parts of thionyl chloride may be altered within a relatively wide range, e.g., from 1:15 to 1:10, the preferred ratio being from 1:2 to 1:1.5. At lower ratios, the reaction time is prolonged and at higher ratios, the elimination of excess thionyl chloride by distillation requires more time and heat without increasing the reaction rate.

EXAMPLE 3

4-Amino-3,5-Dichloro-N-Isopropylbenzamide

A solution of 14 g. of 4-amino-3,5-dichlorobenzoyl chloride in 200 cc. of a 1:1 mixture of acetone and ether is added dropwise to a solution of 7.28 g. isopropylamine in 150 cc. of ether, while agitating the reaction mixture. To keep the mixture from overheating, an ice bath is used to cool the reaction vessel. After completion of the addition, the reaction is virtually terminated, but stirring is continued for one hour. The formed by-product, isopropylamine hydrochloride, is filtered off and washed with 50 cc. of ether. The combined filtrate and wash liquid are evaporated to dryness and the new amide after triturating with water, filtering and drying, is recrystallized from alcohol/water. It has a M.P. of 185–6° C. and an empirical formula of $C_{10}H_{12}N_2O$. The calculated analytical values are 48.59% C, 4.89% H, 28.69% Cl, 11.34% N, and 6.48% O, which compare excellently to the analyzed values of 48.85% C, 5.01% H, 28.75% Cl, 11.33%

N, and 6.50% O. The product may also be recrystallized from xylene/pentane or similar mixtures.

A 5% suspension of this 4-amino-3,5-dichloro-N-isopropylbenzamide in 0.2% tragacanth administered to mice at various dose levels shows an intraperitoneal $LD_{50}$ of 250 mg./kg. and an oral $LD_{50}$ of 650 mg./kg. At a dose level of 50 mg./kg. intraperitoneally or orally, mice show decreased activity without any side reactions such as jerks or tremors.

EXAMPLE 4

Modified Process

A solution of 62 g. of 4-amino-3,5-dichlorobenzoylchloride in 150 cc. of dimethylacetamide is added dropwise to a solution of 15.7 g. of cyclopropylamine and 27.9 g. of triethylamine in 800 cc. of ether while agitating the mixture. The reaction vessel is cooled in an ice bath to keep the reaction temperature at or below room temperature. After completion of the addition, stirring is continued for one hour. The ether is evaporated, and the residual solution is diluted with 400 cc. of water which precipitates the 4-amino-3,5-dichloro-N-cyclopropylbenzamide. It is filtered off, washed with water, and dried. The crude material obtained in this manner has a melting point of 173–175° C. and weighs 63.0 g. which represents 93.5% of theory. The crude 4-amino-3,5-dichloro-N-cyclopropylbenzamide is redissolved in dimethylacetamide and reprecipitated with water. The purified material has a melting point of 174–175° C.

EXAMPLE 5

4-Amino-3,5-Dibromo-N-Cyclopropylbenzamide

A mixture of 442.5 g. (1.5 moles) of 3,5-dibromo-4-aminobenzoic acid, 768 g. of thionyl chloride, and 1158 cc. of dry benzene are heated under reflux without stirring. After about the first 2½ hours of refluxing, the initial cloudiness disappears and the solution becomes clear. After 3¼ hours, the refluxing is interrupted and the volume of the reaction mixture is reduced by removal of about 200–250 cc. of solvent by distillation. The mixture is then cooled and filtered. The solid reaction product is washed well with pentane to remove excess thionyl chloride and benzene and is air-dried. A yield of 91% of 4-amino-3,5-dibromo-benzoylchloride in fine, light canary-yellow needles, melting at 178–80° C. is obtained.

From the above crude acid chloride, 157 g. are dissolved in 250 cc. of warm dimethylacetamide. This solution is added to a mixture of 28.5 g. of cyclopropylamine and 50.5 g. of triethylamine in 180 cc. of dimethylacetamide while stirring and cooling in an ice bath. After the addition is completed, the mixture is stirred for 30 minutes and then diluted with 700–800 cc. of cold water while stirring and cooling. After stirring another 30 minutes, the precipitated 4-amino-3,5-dibromo-N-cyclopropylbenzamide is collected on a filter in a yield of 90%. After recrystallization from alcohol and water or dimethylacetamide and water, a pure colorless product of melting point 150–1° C. is obtained. An analytical sample shows 47.67% bromine as compared to the calculated value of 47.85% bromine for the compound of empirical formula $C_{10}H_{10}Br_2N_2O$.

A 5% suspension of this 4-amino3,5-dibromo-N-cyclopropylbenzamide in 0.2% tragacanth solution is used to establish the toxicity of this compound. With intraperitoneal administration, the $LD_{50}$ is 600 mg./kg. in mice, and with oral administration the $LD_{50}$ in mice is 550 mg./kg. Oral or intraperitoneal administration of this suspension produces decreased activity in mice at 100 mg./kg.

EXAMPLE 6

4-Dimethylamino-3,5-Dichloro-N-Cyclopropylbenzamide

A mixture of 224.5 g. of 3,5-dichloro-4-aminobenzoylchloride, 1000 cc. of methanol and 1 cc. of pyridine are refluxed for 16 hours. The volatile materials are then removed under reduced pressure and the dark residue is taken up in ether. The dark solution is filtered through a bed of charcoal and the resulting almost colorless solution is washed three times with dilute alkali, once with dilute hydrochloric acid, and finally with water. After drying this solution over magnesium sulfate, the solution is concentrated, resulting in a light, straw-colored oil. This oil is further concentrated in an evaporating dish, whereupon the oil solidifies and 213 g. (97%) of crude, white methyl 4-amino-3,5-dichlorobenzoate melting at 83–4° C. is obtained.

A mixture of 22 g. of the above crude methyl ester, 25 cc. of trimethylphosphate, and 1 cc. of dimethylformamide are refluxed 2½ hours. The reaction mixture is cooled, treated with a solution of 33 g. of sodium carbonate in 500 cc. of water and the resulting oil taken up in ether and washed with water. The ether is evaporated and the resulting crude methyl 4-dimethylamino-3,5-dichlorobenzoate is refluxed 3 hours in mixture with 28 g. of potassium hydroxide in 100 cc. of water and 200 cc. of methanol. Most of the alcohol is removed under vacuum and the mixture is diluted with water. The resulting slightly cloudy solution is extracted once with ether and the aqueous solution is then acidified to precipitate the substituted benzoic acid. A yield of 17.5 g. of 4-dimethylamino-3,5-dichlorobenzoic acid melting at 144–7° C. is obtained. After recrystallization from alcohol and water, it is obtained in long colorless needles melting at 156–7° C. and analyzing 46.06% C, 4.15% H, 30.48% Cl, 6.06% N, and 12.94% O, corresponding to the calculated values for $C_9H_9Cl_2NO_2$.

A mixture of 13.5 g. of 4-dimethylamino-3,5-dichlorobenzoic acid and 50 cc. of thionyl chloride are refluxed. After 5 hours the excess thionyl chloride is removed under vacuum and the last traces thereof are removed by repeated addition and distillation of small amounts of benzene. The crude 4-dimethylamino-3,5-dichlorobenzoylchloride is dissolved in 100 cc. of dry ether and added dropwise, with stirring and cooling, to 6.6 g. of cyclopropylamine in 100 cc. of dry ether. After stirring for 1 hour, the ether is removed and the resulting oily residue is triturated with water. The product, 4-dimethylamino-3,5-dichloro-N-cyclopropylbenzamide, solidifies in a yield of 15.40 g. melting at 110–12° C. The material is dissolved in ether and washed first with dilute hydrochloric acid, then with dilute sodium hydroxide, and finally with water. After evaporation of the ether, the remaining solid has a melting point of 121–3° C. After recrystallizing this material from Skelly B (a saturated hydrocarbon mixture predominantly consisting of hexane), the melting point is 122–3° and the analytical values are 52.91% C, 14.96% H, 25.84% Cl, 10.37% N, and 6.33% O, which values correspond closely to the calculated values for $C_{12}H_{14}Cl_2N_2O$.

A 5% suspension of 4-dimethylamino-3,5-dichloro-N-cyclopropylbenzamide in 0.2% tragacanth is used as in previous examples to establish toxicity and activity of this compound. In mice the $LD_{50}$ is 400 mg./kg. intraperitoneally, and 900 mg./kg. orally; either route of administration produces decreased activity at 100 mg./kg. in mice.

By replacing trimethylphosphate of the above example with triethylphosphate, 4-diethylamino-3,5-dichloro-N-cyclopropylbenzamide is obtained in similar yield.

4-monoalkylamino-3,5-dihalogen-N-alkylbenzamides are made in known manner by reacting 4-alkylamino-3,5-dihalogenbenzoic acid with ethylchlorocarbonate to the corresponding mixed anhydride which is then reacted with the desired alkylamine to the corresponding amide.

EXAMPLES 7–15

In the following table, other compounds related to those shown above are described together with their melting points, recrystallization solvents and analytical values. All these compounds are made by the method described in Example 5. The radicals R and R' are the amido-N substituents of 4-amino-3,5-dichlorobenzamide.

TABLE

| No. | R | R' | M.P. in °C. | Analysis, percent Cl | Recrystallization solvent |
|---|---|---|---|---|---|
| 7 | nC$_3$H$_7$ | H | 98–9 | 28.62 | Skelly C. |
| 8 | C(CH$_3$)$_3$ | H | 144–5 | 27.02 | alcohol/water. |
| 9 | CH$_2$CH=CH$_2$ | H | 142–3 | 28.89 | Do. |
| 10 | CH$_2$C≡CH | H | 173–4 | 29.07 | Do. |
| 11 | nC$_3$H$_7$ | nC$_3$H$_7$ | 90–1 | 24.40 | Skelly B. |
| 12 | iC$_3$H$_7$ | iC$_3$H$_7$ | 125–6 | 24.76 | Skelly C. |
| 13 | CH$_2$—◁ | H | ¹150–1 | ¹27.11 | isopropanol/water. |
| 14 | —◇ | H | 189–90 | 27.25 | alcohol. |
| 15 | —◁ | (CH$_2$)$_2$OH | 160–1 | 24.73 | alcohol/water. |

¹ Half hydrate.

All the above-listed compounds, when administered to mice at various dosages as a 5% suspension in 0.2% tragacanth, show intraperitoneal LD$_{50}$'s of between 400 and 900 mg./kg. and between 900 and 2000 mg./kg. when administered orally. Decreased activity is found at dosages varying between 50 and 300 mg./kg. intraperitoneally, and at 200 to 500 mg./kg. orally.

Other examples of compounds falling within the above definition and being made in the fashion of the above examples are N-cyclobutyl-N-methylamides, N-propargyl-N-propylamides, N-butyl-N-butenylamides, N,N-dibutylamides, N-β-hydroxyethyl-N-propylamides, N,N-dipropenylamides, N-cyclobutyl-N-ethylamides, N-isopropyl-N-pentylamides, N-tert.butyl-N-ethylamides, N-cyclopropyl-N-heptylamides, N-isobutyl-N-methylamides, N-α-methylpropyl-N-ethylamides, N-butenylamides, N-allyl-N-methylamides, N-methylcyclopropyl-N-propylamides, N-cyclopropylmethyl-N-butylamides, etc. of 4-amino-3,5-dichlorobenzoic acid, 4-alkylamino-3,5-dichlorobenzoic acids, 4-dialkylamino-3,5-dichlorobenzoic acid, and the corresponding 3,5-dibromobenzoic acids.

The new compounds of the present invention, as pointed out above, are useful as tranquilizers, anticonvulsants and anti-strychnine drugs in warm blooded animals. To obtain such effects in humans, daily dosages of 150 to 500 mg. are indicated for oral administration. Obviously, this dose may be divided into several portions to be given over a 24-hour period. These drugs have a very long-lasting effect and extremely low toxicity. The active ingredients may be administered alone or in combination with other drugs in any acceptable pharmaceutical form, e.g. as tablet, in capsules, or in solution with the usual excipients, adjuvants, coatings, flavoring agents, etc.

This application is a continuation-in-part of my co-pending application, U.S. Serial No. 59,152, filed September 29, 1960, now abandoned, which in turn is a continuation-in-part of my application, U.S. Serial No. 851,539, filed November 9, 1959, now abandoned.

Others may practice the invention in any of the numerous ways which will be suggested by this disclosure to one skilled in the art. All such practice of the invention is considered to be a part hereof provided it falls within the scope of the appended claims.

I claim:
1. A compound of the formula:

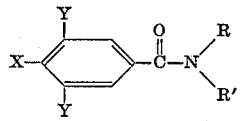

wherein R is selected from the group consisting of a hydrocarbon radical containing 3–4 carbon atoms; R' is selected from the group consisting of hydrogen, loweralkyl and β-hydroxyethyl; each Y is a halogen selected from the group consisting of chlorine and bromine; and X is selected from the group consisting of NH$_2$, NH-loweralkyl, and N(loweralkyl)$_2$.
2. 4-amino-3,5-dichloro-N-isopropylbenzamide.
3. 4-amino-3,5-dichloro-N-cyclopropylbenzamide.
4. 4-amino-3,5-dichloro-N-cyclobutylbenzamide.

References Cited in the file of this patent
UNITED STATES PATENTS

| 2,551,891 | Martin et al. | May 8, 1951 |
| 2,783,245 | Weidenheimer et al. | Feb. 26, 1957 |
| 2,901,507 | Speeter et al. | Aug. 25, 1959 |

OTHER REFERENCES

Sheibley: Journ. of Organic Chemistry, vol. 12, pages 743–751, page 749 relied on (1947).

Degering: An Outline of Organic Nitrogen Compounds, published by University Lithoprinters, Ypsilanti, Mich., pages 393–397, page 396 relied on (1950).

Noller: Chemistry of Organic Compounds, published by W. B. Saunders, page 240 (1951).

UNITED STATES PATENT OFFICE
CERTIFICATE OF CORRECTION

Patent No. 3,066,167            November 27, 1962

Bruce W. Horrom

It is hereby certified that error appears in the above numbered patent requiring correction and that the said Letters Patent should read as corrected below.

Column 2, line 22, for "of" read -- or --; line 47, for "1:15" read -- 1:1.5 --; line 48, for "1:1.5" read -- 1:5 --.

Signed and sealed this 21st day of May 1963.

(SEAL)
Attest:

ERNEST W. SWIDER
Attesting Officer

DAVID L. LADD
Commissioner of Patents